Feb. 19, 1957

E. K. DOMBECK 2,781,867

BRAKE AND ANCHOR ASSEMBLY

Filed Jan. 24, 1951

INVENTOR.
EDWARD K. DOMBECK
BY
G. A. Gust
ATTORNEY

Feb. 19, 1957  E. K. DOMBECK  2,781,867
BRAKE AND ANCHOR ASSEMBLY
Filed Jan. 24, 1951  3 Sheets-Sheet 3
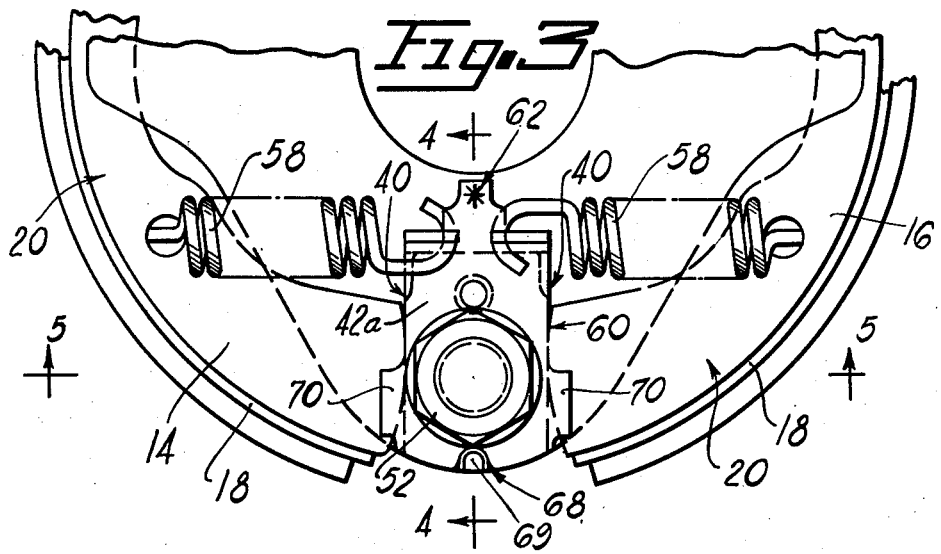
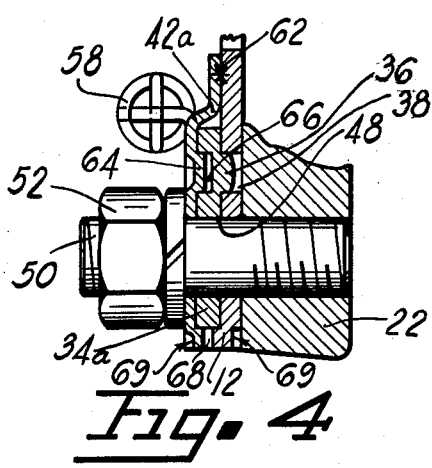
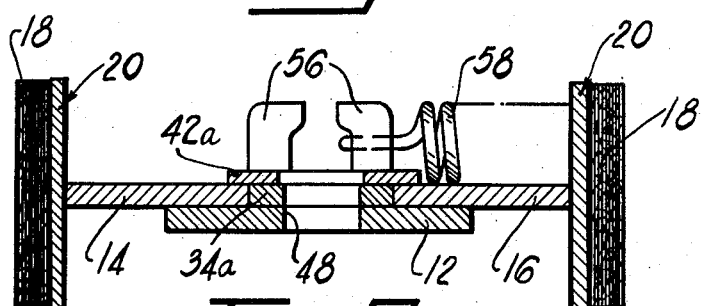
INVENTOR.
EDWARD K. DOMBECK
BY
ATTORNEY

United States Patent Office 2,781,867
Patented Feb. 19, 1957

2,781,867

BRAKE AND ANCHOR ASSEMBLY

Edward K. Dombeck, South Bend, Ind., assignor to Bendix Aviation Corporation, South Bend, Ind., a corporation of Delaware Application January 24, 1951, Serial No. 207,469

6 Claims. (Cl. 188—78)

This is a continuation-in-part of application Serial Number 12,760 filed March 3, 1948, and now Patent No. 2,728,418.

This invention relates to improvements in brakes and has among its objects: (1) to provide an improved construction and arrangement of a nonservo brake, i. e. a brake in which both shoes anchor at one side of the brake and are actuated at the other side; (2) to provide a novel and improved mounting arrangement for the anchor member of the brake; and (3) to provide an anchor construction which is more economical to produce.

The manner of achieving these objects will be described and explained in the following description of the invention.

Other objects and advantages of the present invention will become apparent during the following description of illustrative embodiments of this invention, reference being had therein to the accompanying drawings, in which:

Figure 3 is a fragmental side elevation of another embodiment of this invention;

Figure 4 is an axial section of Figure 3 taken substantially on section line 4—4 thereof; and Figure 5 is a section taken substantially on section line 5—5 of Figure 3.

Figure 1:
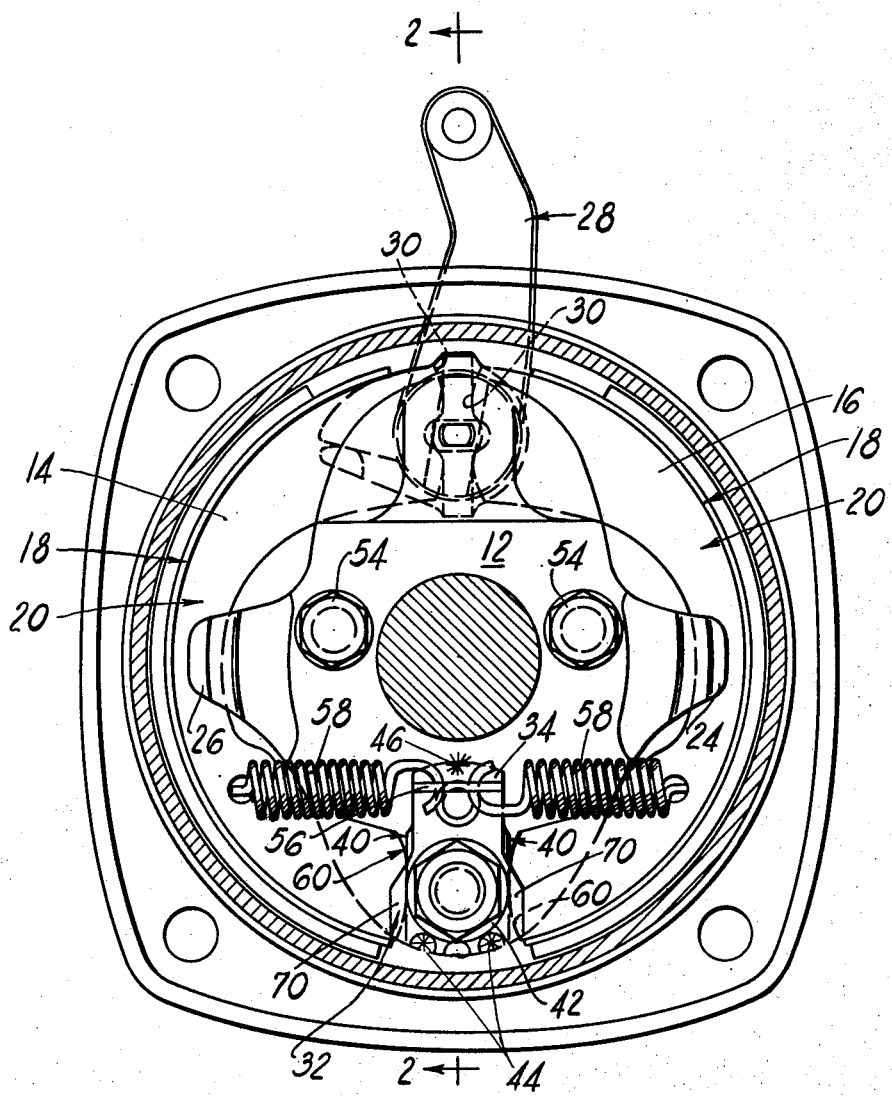
Figure 1 is a side elevation of a brake assembly embodying the present invention.

Referring to the drawings, a supporting member, or spider plate, 12 has mounted thereon two T-section brake shoes 14 and 16, each having a rim 18 and web 20, and is secured to a non-rotating member, such as the bearing carrier 22. Although the present invention is generally applicable to all brakes, regardless of the use for which they are intended, the illustrated version is particularly adapted to serve as a brake on a farm tractor. On a vehicle of this type, the bearing carrier 22 is itself secured to the differential housing.

The supporting member 12 is provided with radially outwardly extending arms 24 and 26 which are offset from the plane of the supporting member and arranged to engage the webs 20 of the respective shoes 14 and 16. As illustrated in Figure 1, the upper portion of the supporting member 12 is arranged to carry a brake actuating mechanism 28 which is adapted to spread the adjacent ends 30 of the shoes 14 and 16. The opposite portion of the supporting member 12 has secured thereto the brake anchor generally indicated by reference numeral 32.

This anchor 32 comprises an anchor plate 34 which is rectangular in shape and located against the supporting member 12 so that its longitudinal axis coincides with a radius of the brake. A boss 36 is provided on the anchor plate 34 and is received in an opening or recess 38 in supporting member 12. This projection and recess, 36 and 38, serve to partially locate the anchor plate 34 on the supporting member 12.

The longitudinal edges of the anchor plate 34 are finished substantially parallel to the longitudinal center line of this anchor plate 34 to provide shoe-engaging surfaces 40. In manufacturing, after the shoe-engaging surfaces have been finished, the plate 34 is hardened for a purpose which will hereafter become apparent.

Figure 2:
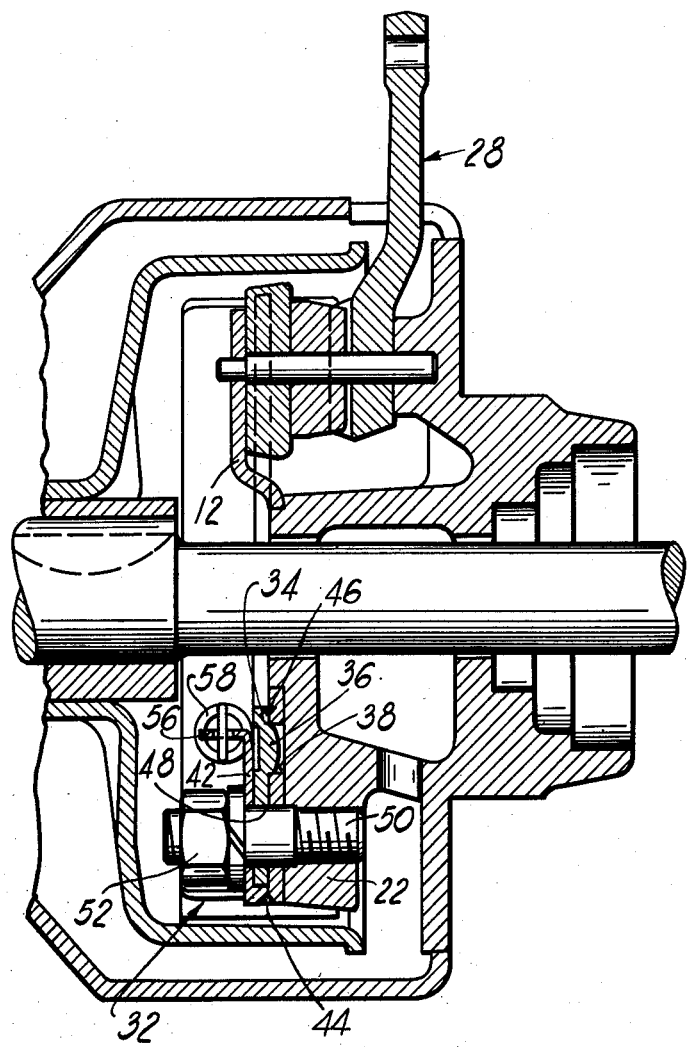
Figure 2 is an axial section of Figure 1 taken substantially on section line 2—2 thereof.

Referring more particularly to Figures 1 and 2, a retainer plate 42 is superposed on anchor plate 34 to hold the same in position against the supporting member 12. This holding is accomplished by spot weldings 44 along the bottom edge of retainer plate 42, fusion being obtained between the anchor plate 34 and the retainer plate 42 and supporting member 12. Also, to insure the location of the anchor plate 34, a weld is provided at the upper end edge of the plate 34 to the supporting member 12 as indicated at 46. Opening 48 is provided through the two plates 34 and 42 and the supporting member 12 for receiving therethrough a fastening member or anchor stud 50, one end of which is threadedly received in the non-rotating member 22. The other end of stud 50 receives a nut and washer 52 which rigidly clamp the two plates 34 and 42 together. This stud 50, in combination with the bolts 54, serves to rigidly secure the brake assembly to the non-rotating member 22.

The radially inner end of the retainer plate 42 is bent away from supporting member 12 and notched or apertured to provide a connecting flange 56 for the two shoe return springs 58. The other ends of these springs 58 are connected to respective shoes 14 and 16, said springs urging the shoes into engagement with the anchor 32.

As more clearly illustrated in Figures 1 and 3, the ends of the webs 20 adjacent the anchor 32 are convexly curved, as at 60, for both sliding and rocking engagement with the respective shoe-engaging surfaces 40. It may be stated at this point, that the shoe-engaging surfaces 40 may be disposed in different angular relations with respect to the brake radius without departing from the scope of this invention; however, these surfaces must be at angles which will provide for self-centering of the brake shoes 14 and 16. This self-centering feature may be exemplified by considering it as automatic maintenance of the brake shoes in substantial concentricity with the drum during all brake release conditions.

One important advantage to be gained by this particular anchor construction is the economy achieved in production. Heretofore, a single piece had been used as the anchor and had been machined or grooved to receive the respective ends of the webs 20. This required that each anchor piece be handled individually. With the present construction, a number of the anchor plates 34 are stamped and arranged in a symmetric pile, an operation then being performed on the pile to form the individual shoe-engaging surfaces 40. Thus it is seen, that the parts 34 are not individually handled and are consequently more economically produced than the similar articles mentioned above.

Referring now more particularly to Figures 3 to 5, a slightly different embodiment of the present invention is illustrated which bears an advantage over the embodiment illustrated in Figure 1. Like numbers will indicate like parts.

Here, the anchor plate 34a is neither welded to the retaining plate 42a nor to the supporting member 12. Instead, only one weld is used at the upper end 62 of the retaining member 42a for fastening the same to the supporting member 12. Also, a projection 64 is provided on the retaining plate 42a which fits into a recess 66 formed in the contiguous face of the anchor plate 34a. To insure positive positioning between the various anchor parts, the anchor plate 34a may be notched, as at 68, along its lower end to receive the facing indentations 69 formed on the retainer plate 42a and the supporting member 12.

This latter embodiment has been found to be more economical to produce than the former, especially since it eliminates spot welding through the hardened anchor plate 34 which is an expensive operation.

Also, since the plate 34a is not rigidly fastened to either the retaining plate 42a or the support 12, it is capable of slight movement with respect thereto. Thus, in assembling the stud 50, the holes 48 in these parts may be easily aligned without the necessity of a reaming or broaching operation. In the embodiment of Figures 1 and 2, if the hole 48 in anchor 34 should be located to one side of the companion openings in plate 42 and support 12 after the welds 44 and 46 are completed to fasten the parts rigidly together, the mislocation is corrected by a reaming operation or the like which is obviously an item of cost. This item being omitted in the embodiment of Figures 3 to 5, it is obvious that a more economical result will be obtained.

The boss 36 and recess 38 serve to partially locate the plates 42a and 34a with respect to the supporting member 12, the arrangement being such as to facilitate the assembly of the parts thereby reducing (as compared with prior art structure) the time needed in producing the completed construction.

In both of the foregoing embodiments, the shoes are located in position by means of the arms 24 and 26 formed on the supporting member 12, the supporting member 12 itself, and ears 70 laterally extending from the longitudinal sides of the retaining plate 42 and 42a. As is seen in Figures 2 and 4, the convex ends 60 of the shoe webs 20 are received between the respective ears 70 and the supporting member 12.

In operation, the shoe spreading mechanism 28 is operated to force the adjacent ends 30 of the two shoes outwardly bringing the shoes 14 and 16 into engagement with the rotating drum. Depending upon direction of rotation of the drum, one end 60 of the shoes will anchor against the corresponding shoe-engaging surface 40. Anchoring torque of the anchored, or primary shoe, which engages the anchor 32, is transmitted through the anchor plate 34 or 34a, mounting stud 50, and into the non-rotating member 22.

Although several embodiments of the invention have been illustrated and described, various changes in the form and relative arrangements of the parts may be made to suit requirements.

I claim:

1. A brake, arranged to be mounted on a non-rotating member, comprising a supporting member having two radially outwardly extending shoe guiding arms, a hardened anchor plate having substantially parallel shoe-engaging surfaces formed on opposite lateral edges thereof, a retainer plate fastened at only one end to said supporting member and engaging said anchor plate to urge it against said supporting member, said supporting member and said anchor plate being provided with a mating boss and recess for locating said anchor plate on said supporting member, said anchor and retainer plates and said supporting member being provided with aligned congruent openings, a fastening member received by said openings for securing the anchor and retainer plates and said supporting member rigidly together and to the non-rotating member, said fastening member being adapted to transmit torque directly to the non-rotating member independently of said supporting member, two brake shoes, each having a rim and a web, at least one end of each web being convexly curved for sliding and rocking movement on a corresponding one of said shoe-engaging surfaces, two shoe return springs, each being connected in tension between a corresponding shoe and said retainer plate for maintaining said convex shoe ends in engagement with said anchor plate, and two laterally extending ears formed on said retainer plate and projecting outwardly beyond corresponding shoe-engaging surfaces, said shoes being guided into engagement with said anchor plate by engagement with said supporting member, said arms, and said ears, said shoe-engaging surfaces being disposed in such manner as to provide self-centering action of said shoes.

2. A brake, arranged to be mounted on a non-rotating member, comprising a supporting member having two radially outwardly extending shoe-guiding arms, a hardened anchor plate having substantially parallel shoe-engaging surfaces formed on opposite lateral edges thereof, a retainer plate fastened at only one end to said supporting member and engaging said anchor plate to urge it against said supporting member, said supporting member and said anchor plate being provided with a mating boss and recess for locating said anchor plate on said supporting member, said anchor and retainer plates and said supporting member being provided with aligned congruent openings adapted to receive therethrough a fastening member for securing said plates and said supporting member rigidly together, said fastening member being associated with the non-rotating member in such a manner that braking torque may be directly transmitted thereto independently of said supporting member, two brake shoes, each having a rim and a web, at least one end of each web being convexly curved for sliding and rocking movement on a corresponding one of said shoe-engaging surfaces, two shoe return springs, each being connected in tension between a corresponding shoe and said retainer plate for maintaining said convex shoe ends in engagement with said anchor plate, and two laterally extending ears formed on said retainer plate and projecting outwardly beyond corresponding shoe-engaging surfaces, said shoes being guided into engagement with said anchor plate by engagement with said supporting member, said arms, and said ears, said shoe-engaging surfaces being disposed in such a manner as to provide self-centering action of said shoes.

3. A brake, arranged to be mounted on a non-rotating member, comprising a supporting member having two radially outwardly extending shoe guiding arms, a hardened anchor plate having substantially parallel shoe-engaging surfaces formed on opposite lateral edges thereof, a retainer plate fastened at only one end to said supporting member and engaging said anchor plate to clamp it against said supporting member, said supporting member and said anchor plate being provided with a mating boss and recess for locating said anchor plate on said supporting member, said anchor and retainer plates and said supporting member being provided with aligned congruent openings adapted to receive therethrough a fastening member for securing said plates and said supporting member rigidly together, said fastening member being further adapted to transmit braking torque directly to the non-rotating member, two brake shoes, each having a rim and a web, at least one end of each web being convexly curved for sliding and rocking movement on a corresponding one of said shoe-engaging surfaces, and two laterally extending ears formed on said retainer plate and projecting outwardly beyond corresponding shoe-engaging surfaces, said shoes being guided into engagement with said anchor plate by engagement with said supporting member, said arms, and said ears, said shoe-engaging surfaces being disposed in such a manner as to provide self-centering action of said shoes.

4. A brake, arranged to be mounted on a non-rotating member, comprising a supporting member, a hardened anchor plate having substantially parallel shoe-engaging surfaces formed on opposite lateral edges thereof, a retainer plate fastened at only one end to said supporting member and engaging said anchor plate to clamp it against said supporting member, said supporting member and said anchor plate being provided with a mating boss and recess for locating said anchor plate on said supporting member, said anchor and retainer plates and said supporting member being provided with aligned congruent openings adapted to receive therethrough a fastening member for securing said plates and said supporting member rigidly together, said fastening member having a portion thereof positioned in the non-rotating member in a manner permitting braking torque to be transmitted thereto independently of said supporting member, two brake shoes, each having a rim and a web, at least one end of each web being convexly curved for sliding and rocking movement on a corresponding one of said shoe-engaging surfaces, and two laterally extending ears formed on said retainer plate and projecting outwardly beyond corresponding shoe-engaging surfaces, said shoes being guided into engagement with said anchor plate by engagement with said supporting member and said ears.

5. A brake, arranged to be mounted on a non-rotating member, comprising a supporting member, a hardened anchor plate having substantially parallel shoe-engaging surfaces formed on opposite lateral edges thereof, a retainer plate fastened to said supporting member and to said anchor plate by means of a weld, said anchor plate being fitted between the supporting and retaining members, an anchor pin transversely mounted in the non-rotating member and received through an opening in said anchor plate, two brake shoes, each having a rim and a web, at least one end of each web being convexly curved for sliding and rocking movement on a corresponding one of said shoe-engaging surfaces, and two laterally extending ears formed on said retainer plate and projecting outwardly beyond corresponding shoe-engaging surfaces, said shoes being guided into engagement with said anchor plate by engagement with said supporting member and said ears, said shoe-engaging surfaces being disposed in such a manner as to provide self-centering action of said shoes.

6. A brake, arranged to be mounted on a non-rotating member, comprising a supporting member having two radially outwardly extending shoe-guiding arms, a hardened anchor plate having substantially parallel shoe-engaging surfaces formed on opposite lateral edges thereof, a retainer plate overlying said anchor plate, said retainer and anchor plates being spot welded to said supporting member to retain said plates and said supporting member in assembly, a fastening member received through openings in said anchor and retainer plates and said supporting member for securing them rigidly together and to the non-rotating member, two brake shoes, each having a rim and a web, at least one end of each web being convexly curved for sliding and rocking movement on a corresponding one of said shoe-engaging surfaces, an end of said retainer plate being bent away from the plane of said supporting member and provided with an aperture, two shoe return springs, each being connected in tension between a corresponding shoe and said bent end of said retainer plate by means of said aperture for maintaining said convex shoe ends in engagement with said anchor plate, and two laterally extending ears formed on said retainer plate and projecting outwardly beyond corresponding shoe-engaging surfaces, said shoes being guided into engagement with said anchor plate by engagement with said supporting member, said arms, and said ears.

References Cited in the file of this patent
UNITED STATES PATENTS

| | | |
|---|---|---|
| 1,908,459 | Thomas | May 9, 1933 |
| 1,966,129 | Michael | July 10, 1934 |
| 2,164,866 | Baisch | July 4, 1939 |
| 2,509,643 | House | May 30, 1950 |
| 2,516,995 | House | Aug. 1, 1950 |
| 2,544,030 | House | Mar. 6, 1951 |